United States Patent
Hamano

[11] Patent Number: 5,430,576
[45] Date of Patent: Jul. 4, 1995

[54] REAR FOCUS TYPE ZOOM LENS

[75] Inventor: Hiroyuki Hamano, Kanagawa, Japan

[73] Assignee: Canon Kabushiki Kaisha, Tokyo, Japan

[21] Appl. No.: 83,933

[22] Filed: Jun. 28, 1993

[30] Foreign Application Priority Data

Jun. 30, 1992 [JP] Japan .................. 4-173230

[51] Int. Cl.$^6$ ........................................... G02B 15/14
[52] U.S. Cl. ..................................... 359/684; 359/687
[58] Field of Search ................. 359/684, 687, 683

[56] References Cited

U.S. PATENT DOCUMENTS

| 4,802,747 | 2/1989 | Horiuchi | 359/687 |
| 4,998,809 | 3/1991 | Tsuji et al. | 359/689 |
| 5,009,492 | 4/1991 | Hamano | 359/684 |
| 5,050,972 | 9/1991 | Mukaiya et al. | 359/683 |
| 5,134,524 | 7/1992 | Hamano et al. | 359/687 |
| 5,138,492 | 8/1992 | Hamano et al. | 359/684 |
| 5,285,316 | 2/1994 | Miyano et al. | 359/687 |

FOREIGN PATENT DOCUMENTS

| 58-136012 | 8/1983 | Japan . |
| 62-247316 | 10/1987 | Japan . |
| 63-44614 | 2/1988 | Japan . |
| 1201614 | 8/1989 | Japan . |
| 239011 | 2/1990 | Japan . |

Primary Examiner—Scott J. Sugarman
Attorney, Agent, or Firm—Fitzpatrick, Cella, Harper & Scinto

[57] ABSTRACT

A zoom lens of the rear focus type is disclosed, comprising, from front to rear, a first lens unit of positive power, a second lens unit of negative power, a third lens unit of positive power and a fourth lens unit of positive power, zooming being performed by moving the second and fourth lens unit and focusing being performed by moving the fourth lens unit, while the first and third lens units remain stationary. The first lens unit comprises, from front to rear, a negative meniscus lens and a bi-convex lens, and the second lens unit comprises, from front to rear, a bi-concave lens and a positive lens. The first and second lens units each have at least one aspheric surface. The zoom lens satisfies the following conditions:

$$0.37 < |f_2/\sqrt{f_W \cdot f_T}| < 0.49$$

$$0.65 < |f_3/f_4| < 0.94$$

where $f_2$, $f_3$ and $f_4$ are the focal lengths of the second, third and fourth lens units, respectively, and $f_W$ and $f_T$ are the shortest and longest focal lengths of the entire lens system, respectively.

10 Claims, 6 Drawing Sheets

REAR FOCUS TYPE ZOOM LENS

BACKGROUND OF THE INVENTION

1. Field of the Invention

This invention relates to zoom lenses of the rear focus type and, more particularly, to a large relative aperture, high range zoom lens of the rear focus type whose range is 6–8 and whose F-number is 1.8–2.0 or thereabout, to be used with photographic cameras, video cameras, or broadcasting cameras.

2. Description of the Related Art

In the zoom lenses to be used with photographic cameras or video cameras, the so-called rear focus type is variously proposed in which a lens unit other than the front or first lens unit is moved to effect focusing.

In general, compared with a zoom lens whose front lens unit is movable for focusing, the zoom lens of the rear focus type has the advantage that the effective diameter of the front lens unit becomes small, contributing to a reduction of the bulk and size of the whole lens system, and the advantage that close-up photography, especially, ultraclose-up photography, becomes easy to carry out, and further the advantage that, since a focusing lens unit is relatively small in size and light in weight and a small driving power therefore is sufficient, rapid focusing is possible.

Of the zoom lenses of such a rear focus type, the so-called 4-unit zoom lens disclosed in Japanese Laid-Open Patent Application No. Sho 63-44614, for example, comprises, from front to rear, a first lens unit of positive refractive power, a second lens unit of negative refractive power for varying the focal length, a third lens unit of negative refractive power for compensating for the image shift with variation of the focal length, and a fourth lens unit of positive refractive power, wherein focusing is performed by moving the third lens unit. However, this zoom lens tends to increase in the physical length, because some space must be taken to allow the third lens unit to move.

In Japanese Laid-Open Patent Application No. Sho 58-136012, a zoom section is constructed with three or more lens units, one of which is moved for focusing.

In Japanese Laid-Open Patent Application No. Sho 62-247316, four lens units are used, of which the first, when counted from the object side, is of positive refractive power, the second is of negative refractive power, the third is of positive refractive power and the fourth is of positive refractive power, wherein the second lens unit is moved to vary the focal length, while the fourth lens unit is simultaneously moved to compensate for the image shift, and focusing is performed also by the fourth lens unit.

Meanwhile, in recent years, as video cameras for public use have widespread, there are strong demands for even their lenses to be reduced in size and weight and for their price to be lowered. To meet these demands, it is highly recommended not only to employ the aforesaid rear focus type in the zoom configuration, but also to introduce an aspherical lens to reduce the total number of constituent lens elements. In Japanese Laid-Open Patent Application No. Hei 1-201614, in a 4-unit zoom lens of the rear focus type, aspheric surfaces are introduced into the second to fourth lens units, so that a reduction of the number of lens elements is achieved.

Also, in Japanese Laid-Open Patent Application No. Hei 2-39011, in another 4-unit zoom lens, aspheric surfaces are introduced into the first, third and fourth lens units, so that a reduction of the number of lens elements is achieved.

As described before, the use of the rear focus type in the zoom lens design leads to the possibility of minimizing the bulk and size of the entirety of the lens system and further to the extension of the focusing range to shorter object distances.

On the other hand, however, the variation of aberrations with focusing is increased so largely as to give rise to a very difficult problem of simultaneously fulfilling the requirements of minimizing the size of the entire lens system and of maintaining a high optical performance for an infinitely distant object to an object at the minimum distance, or throughout the entire focusing range.

Particularly, in a large relative aperture, high range zoom lens, the problem of maintaining good stability of high optical performance throughout the entire zooming range as well as the entire focusing range becomes very serious.

It has been known in the art to make aspherical some of the lens surfaces so that the number of constituent lens elements is reduced and the various aberrations are well corrected. With not only the zoom type but also many other types of photographic systems, such an aspheric lens surface has been adopted in various ways. The mere replacement of the spherical surface by an aspherical surface, however, does not insure that the optical system takes a much simplified form, and does not remarkably diminish the difficulty of correcting various aberrations for high optical performance.

SUMMARY OF THE INVENTION

An object of the invention is to provide a zoom lens of large relative aperture and extended range, while still preventing the bulk and size of the entire lens system from increasing. For this purpose, the rear focus type is employed in the zoom lens, a condition for selection of a lens unit to which an aspheric surface is applied, is set forth, and the form of the aspheric surface is appropriately specified. Another or second object of the invention is to provide a zoom lens of the rear focus type which, although being constructed in simple form, maintains good stability of optical performance throughout the entire zooming range and throughout the entire focusing range. A third object of the invention is to provide a zoom lens whose total number of constituent lens elements is very few.

A zoom lens of the rear focus type according to the invention comprises, from front to rear, a first lens unit of positive refractive power, a second lens unit of negative refractive power, a third lens unit of positive refractive power and a fourth lens unit of positive refractive power, totaling four lens units. Zooming is performed by moving the second and fourth lens units, while focusing is performed by moving the fourth lens unit. The first and third lens units remain stationary during zooming and during focusing. The first lens unit comprises, from front to rear, a negative meniscus lens and a biconvex lens, and the second lens unit comprises a biconcave lens and a positive lens. In addition, the first and second lens unit each have at least one aspheric surface, and conditions to be described later are set forth.

BRIEF DESCRIPTION OF THE DRAWINGS

In these drawings, FIGS. 3(A), 4(A) and 5(A) are in the wide-angle end, FIGS. 3(B), 4(B) and 5(B) in an intermediate zooming position, and FIGS. 3(C), 4(C) and (C) in the telephoto end. "d" stands for the spectral d-line, "g" for the spectral g-line, $\Delta S$ for the sagittal image surface and $\Delta M$ for the meridional image surface.

DETAILED DESCRIPTION OF THE PREFERRED EMBODIMENTS

Figure 1:
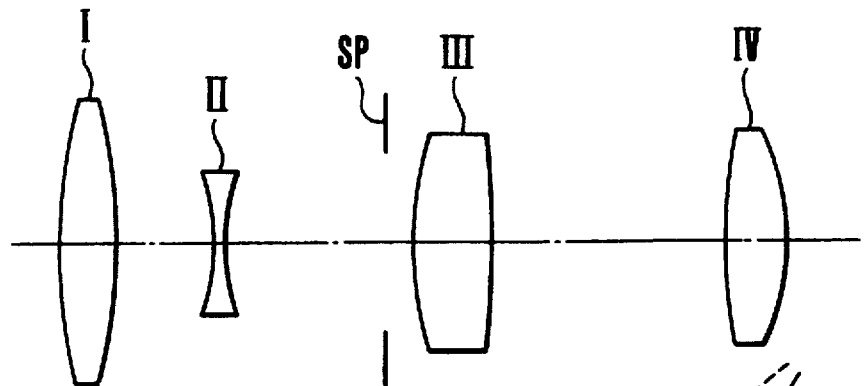
FIG. 1 is a diagram of the paraxial refractive power arrangement of a zoom lens according to the invention.

FIG. 1 is a schematic diagram of an embodiment of a zoom lens of the rear focus type according to the invention with the paraxial refractive power arrangement shown.

The zoom lens comprises, from front to rear, a first lens unit I of positive refractive power, a second lens unit II of negative refractive power, a third lens unit III of positive refractive power and a fourth lens unit IV of positive refractive power. An aperture stop SP is arranged in front of the third lens unit III.

During zooming from the wide-angle end to the telephoto end, the second and fourth lens units are moved in differential relation as shown by arrows, in such a manner that the second lens unit is moved toward the image side, while the fourth lens unit is moved to compensate for the image shift with variation of the focal length.

For focusing purposes, the fourth lens unit is also moved axially. That is, the rear focus type zoom lens is employed. With an infinitely distant object or a close object in focus, as zooming goes from the wide-angle end to the telephoto end, the fourth lens unit is moved along a locus shown by a solid line curve 4a or a dashed line curve 4b in FIG. 1, respectively, to compensate for the shift of an image plane with variation of the focal length.

Incidentally, the first and third lens units remain always stationary.

In the present embodiment, both the provision for compensating for the image shift with variation of the focal length and the provision for focusing are made on the fourth lens unit. In particular, during zooming from the wide-angle end to the telephoto end, the fourth lens unit has its locus made convex toward the object side, as shown by the curves 4a and 4b in FIG. 1. This means that the space between the third and fourth lens units is effectively utilized. Thus, a shortening of the total length of the zoom lens is advantageously achieved.

In the present embodiment, with the zooming set in, for example, the teletphoto end, during focusing from an infinitely distant object to an object at the minimum distance, the fourth lens unit is moved forward as indicated by a straight line 4c shown in FIG. 1.

In the present embodiment, compared with the prior known 4-unit zoom lens whose first lens unit is moved forward for focusing, the first lens unit of the rear focus type zoom lens has its effective diameter prevented from increasing.

The arrangement of the aperture stop just before the third lens unit gives rise to another advantage that the range of variation of the aberrations due to the movable lens units is minimized and, as the separation between the lens units ahead of the aperture stop is shortened, it is made easier to achieve the shortening of the diameter of the front lens unit.

Also because, in the present embodiment, the first and second lens units each are make up from the lenses of such forms as defined before, an optical performance that is excellent throughout the entire zooming range is obtained, despite the simplification of structure of the whole lens system.

Figure 2:
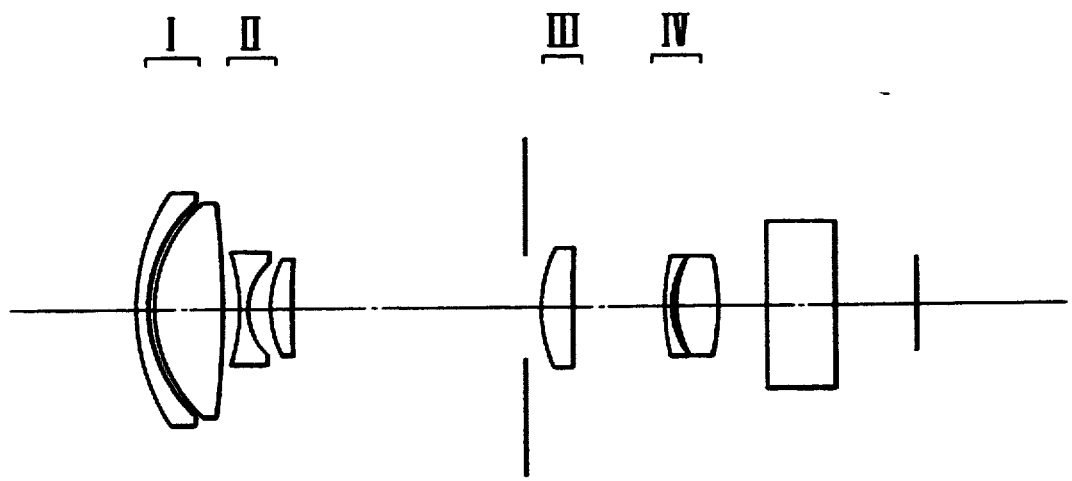
FIG. 2 is a longitudinal section view of a numerical example 1 of a zoom lens according to the invention.
Figure 3A:
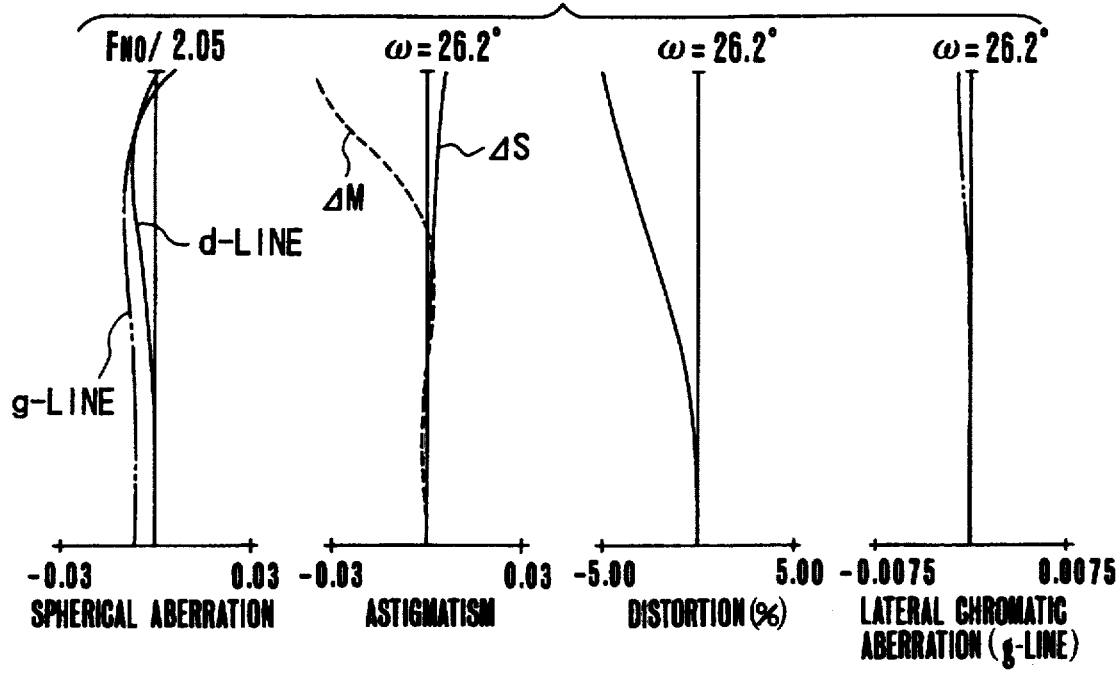
FIGS. 3A, 3B and 3C are graphic representations of the various aberrations of the zoom lens of the numerical example 1.
Figure 3B:
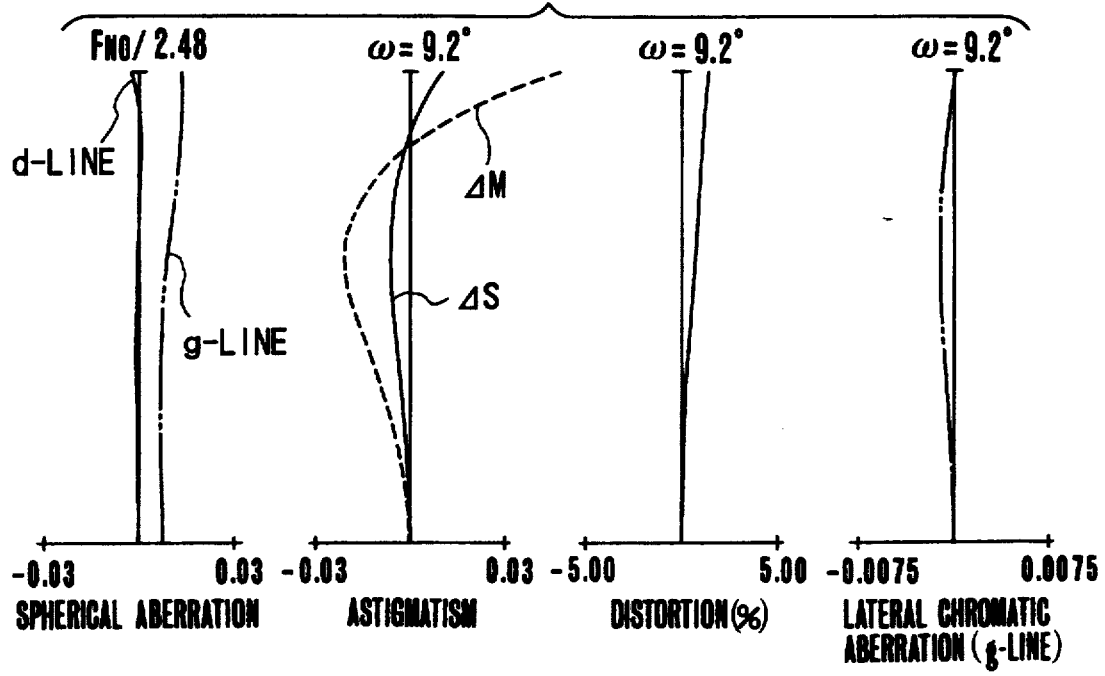
Figure 3C:
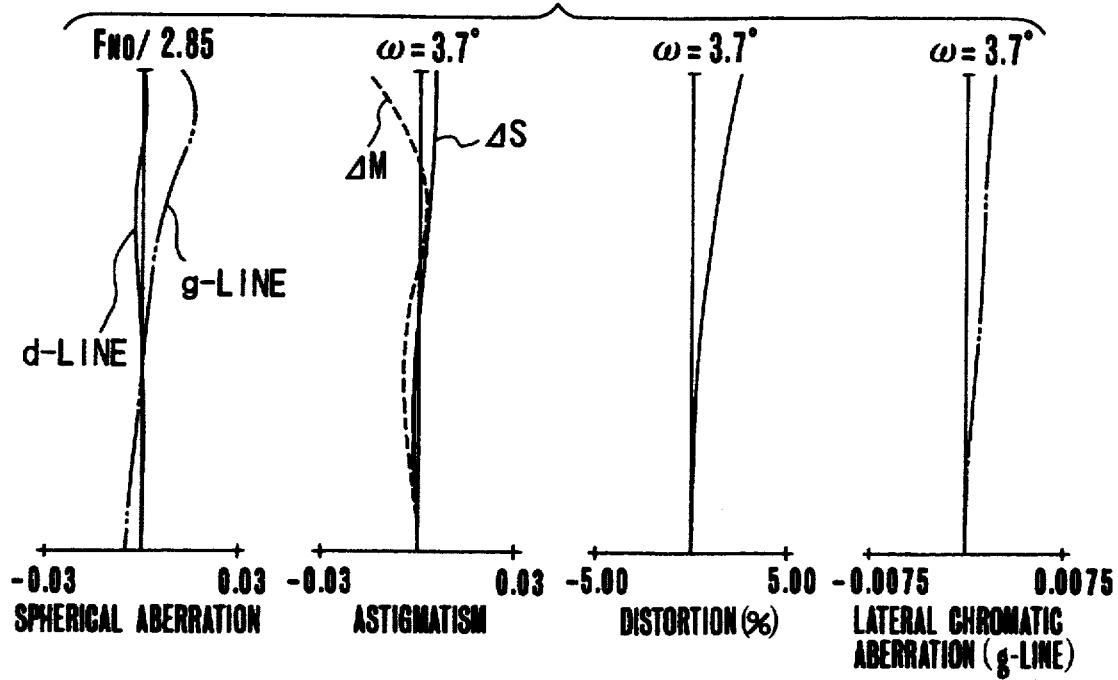
Figure 4A:
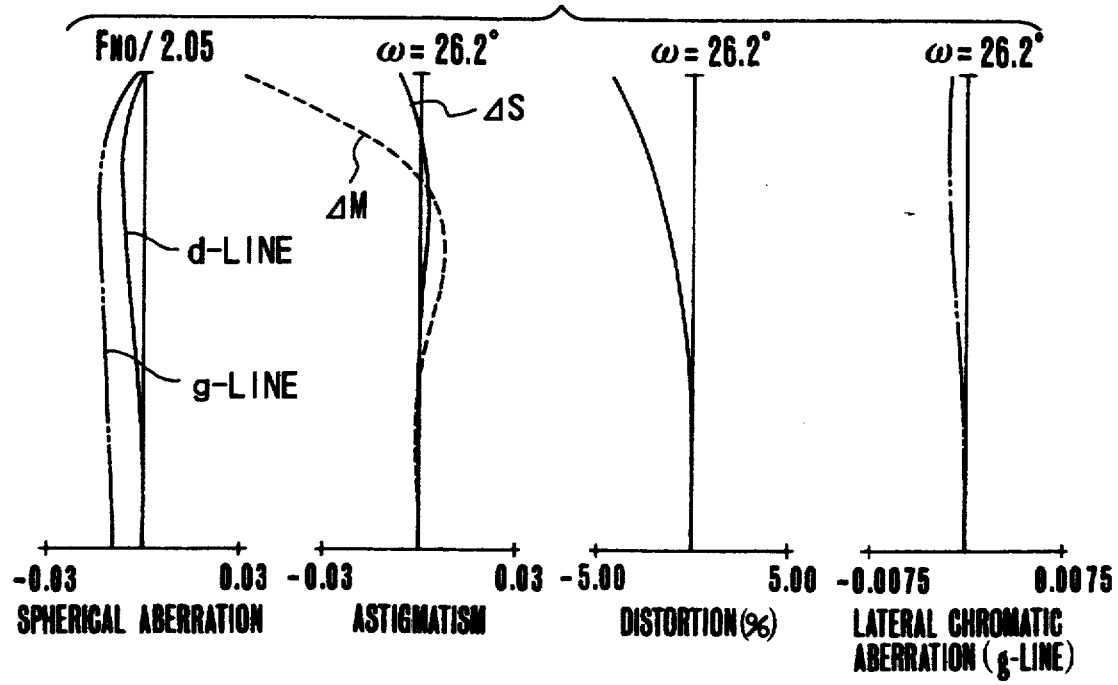
FIGS. 4A, 4B and 4C are graphic representations of the various aberrations of the zoom lens of a numerical example 2.
Figure 4B:
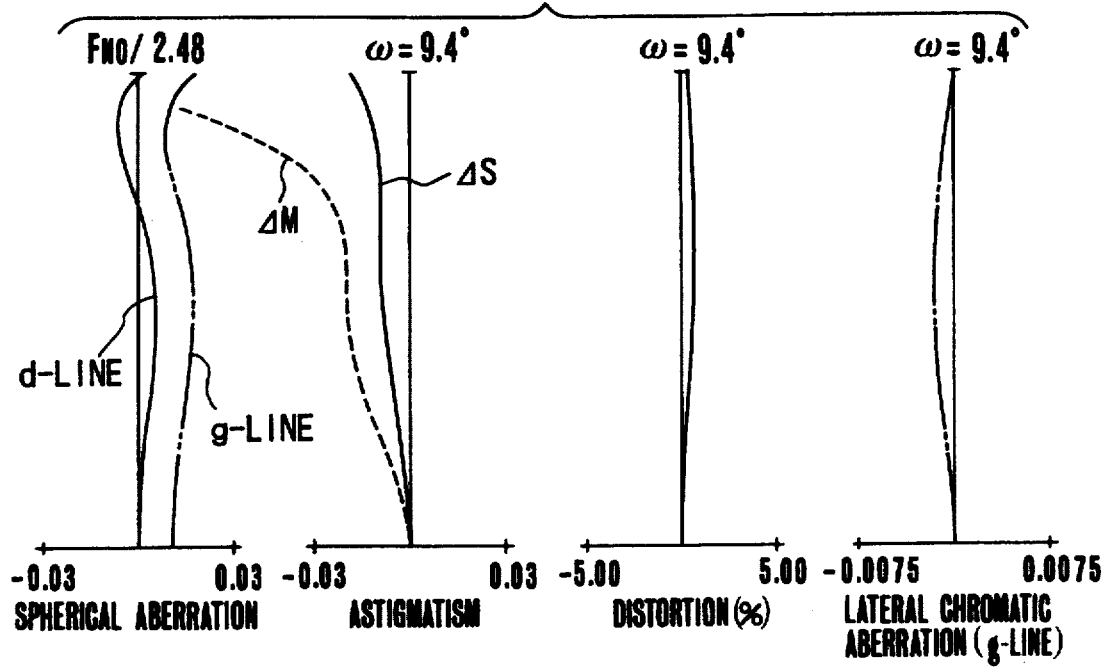
Figure 4C:
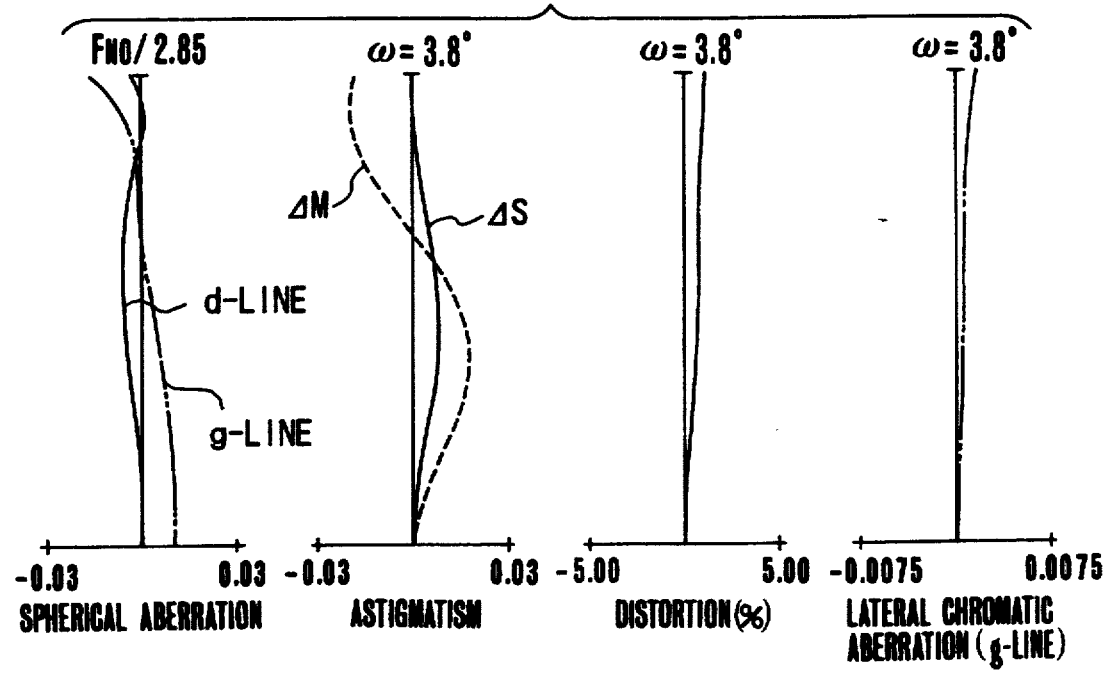
Figure 5A:
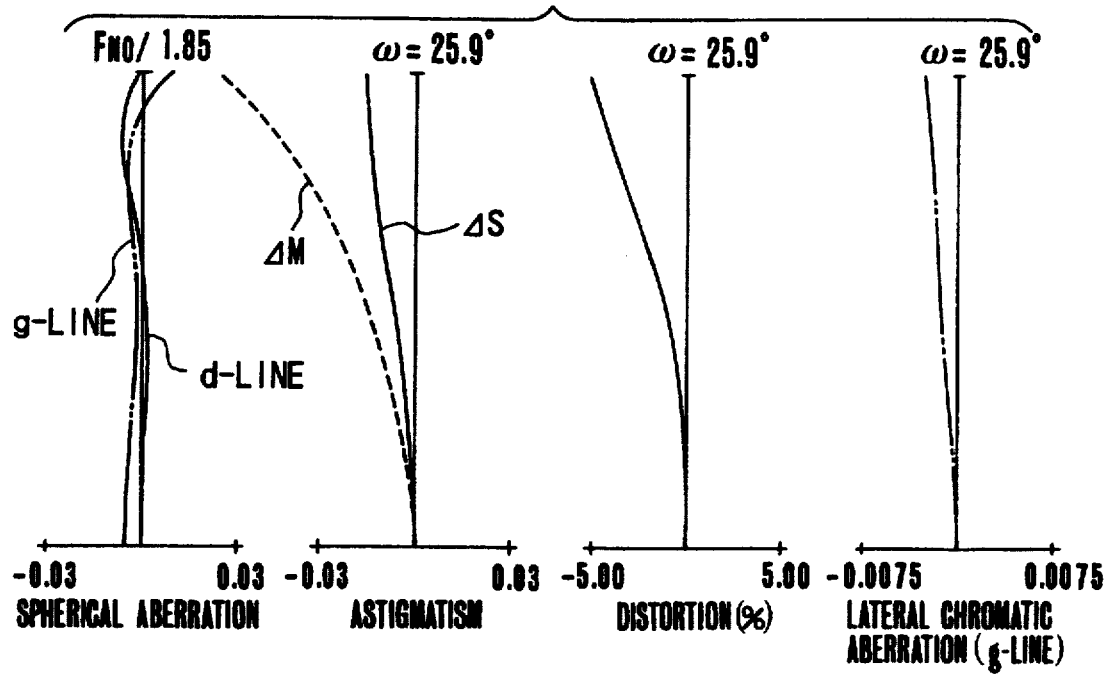
FIGS. 5A, 5B and 5C are graphic representations of the various aberrations of the zoom lens of a numerical example 3.
Figure 5B:
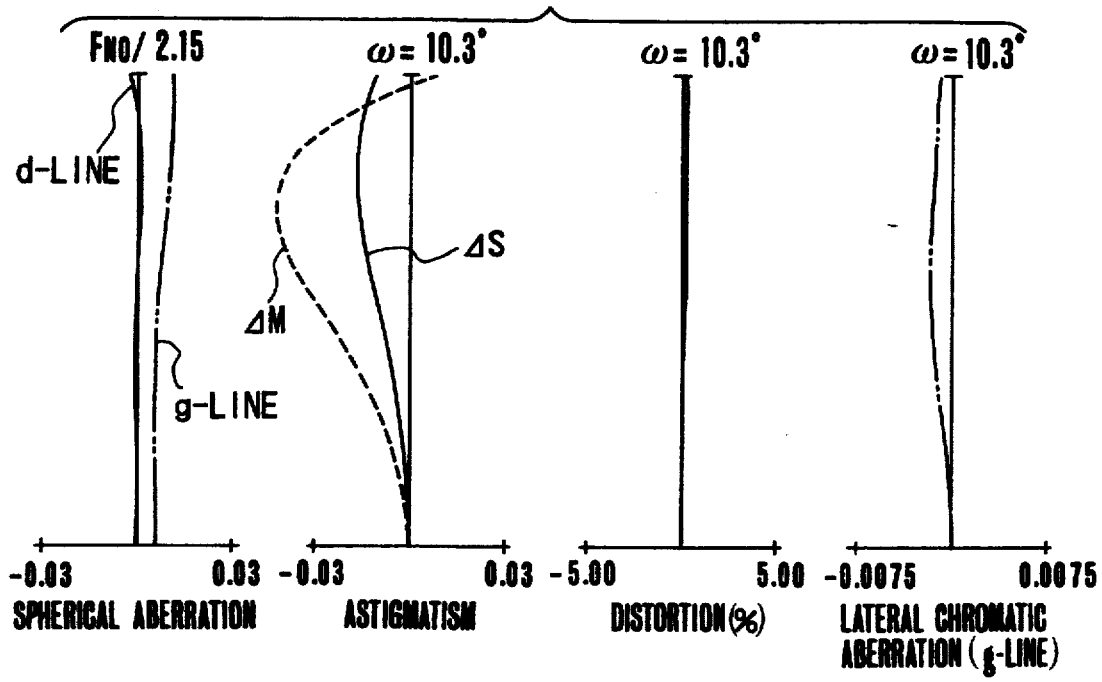
Figure 5C:
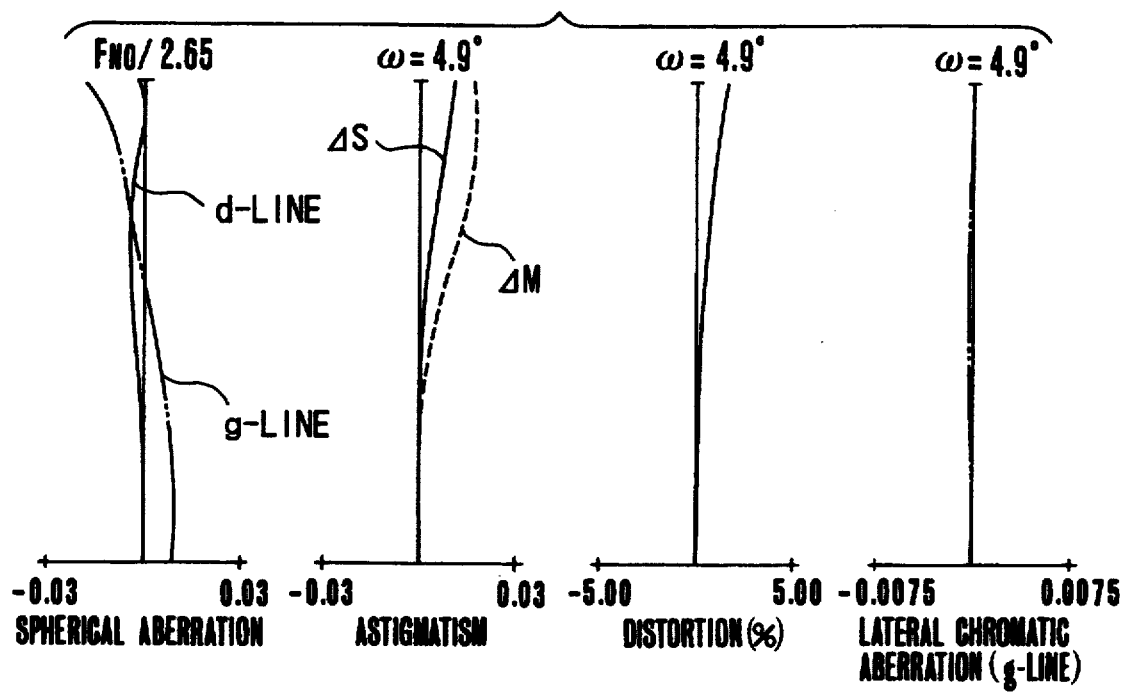

A numerical example 1 of a specific zoom lens according to the invention is shown in the block diagram of FIG. 2.

In this example of the zoom lens, an aspheric surface is applied to at least one of the lens surfaces in the first lens unit. This aspheric surface has such a shape that, within a zone of 0.7 of the effective diameter, a positive refractive power gets progressively weaker from its center to its marginal portion. This employment of the aspheric surface reduces the number of lens elements in the first lens unit, while still permitting spherical aberration and coma to be corrected well especially in the telephoto end.

Also, in the second lens unit, at least one lens surface is formed into an aspheric surface having such a shape that, within a zone of 0.7 of the effective diameter, a negative refractive power gets progressively smaller from its center to its marginal portion, thereby well correcting the variation of aberrations with zooming. This employment of the aspheric surface is combined with such construction of the second lens unit as comprising a negative lens whose surfaces both are concave and a positive lens, totaling two lenses, thus contributing to a reduction of the total number of lens elements of the entire lens system.

Further, with the focal length of the i-th lens unit when counted from the object side be denoted by $f_i$, the following conditions are set forth:

$$0.37 < |f_2/\sqrt{f_W \cdot f_T}| < 0.49 \quad (1)$$

$$0.65 < |f_3/f_4| < 0.94 \quad (2)$$

where $f_W$ and $f_T$ are focal lengths in the wide-angle end and the telephoto end of the entire lens system, respectively. When the optical parameters of the lens units satisfy these conditions, improved results are attained in the optical performance of the zoom lens of high range throughout the entire zooming range and further throughout the focusing range with the limitation of the size of the entire lens system to a minimum.

The technical significance of each of the above-described conditions (1) and (2) is explained below.

The inequalities of condition (1) are concerned with the refractive power of the second lens unit and have an aim of efficiently obtaining a predetermined value of the zoom ratio under the condition that the variation of aberrations with zooming is minimized. When the lower limit is exceeded, as this implies that the refractive power of the second lens unit is too strong, the size of the whole lens system becomes easy to minimize, but the Petzval sum increases in the negative direction, and large curvature of field results. Moreover, the aberrations vary to larger extent with zooming. When the refractive power of the second lens unit is too weak beyond the upper limit, the variation of aberrations with zooming is lessened, but the required amount of movement of the second lens unit for a predetermined zoom ratio is increased to elongate the total length of the entire lens system objectionably.

The inequalities of condition (2) are concerned with the refractive powers of the third and fourth lens units and have an aim of shortening the total length, particularly, the overall length of the lens units behind the stop, in such a manner that the optical performance is held excellent. When the lower limit of the condition (2) is exceeded, as this means that the refractive power of the third lens unit is too strong, a certain necessary back focal distance becomes difficult to obtain and the spherical aberration is under-corrected. So, it should be avoided. Conversely when the refractive power of the third lens unit is too weak beyond the upper limit, an insufficient shortening of the overall length of the lens units behind the stop results.

According to the invention, it is desired that the bi-concave lens in the second lens unit has a strong negative refracting surface facing the image side, and at least the rear surface of the bi-concave lens in the second lens unit is aspherical. Letting the Abbe number and refractive index of the bi-concave lens in the second lens unit be denoted by $\nu_{21}$ and $N_{21}$, respectively, and the Abbe number of the positive lens in the second lens unit be denoted by $\nu_{22}$, the following conditions are set forth:

$$N_{21} > 1.75 \quad (3)$$

$$\nu_{21} - \nu_{22} > 20 \quad (4)$$

When these conditions are satisfied, the optical performance is held excellent despite the use of only two lens elements in the second lens member.

When the refractive index of the bi-concave lens is smaller than the lower limit of the condition (3), the variation of spherical aberration and coma with zooming becomes difficult to correct. When the difference between the Abbe numbers of the bi-concave lens and the positive lens is smaller than the lower limit of the condition (4), the variation of longitudinal and lateral chromatic aberrations with zooming become difficult to correct. Furthermore, in the present embodiment, additional aspherical lenses are introduced into the third and fourth lens units, too. So, for the third lens unit, a single lens is sufficient. For the fourth lens unit, a negative lens of meniscus form convex toward the object side and a positive lens, i.e., two lenses, are sufficient. Hence, the seven lenses in total suffices for constructing the zoom lens.

Next, specific examples 1 to 3 of the invention are shown. In the numerical data for these examples 1 to 3, Ri is the radius of curvature of the i-th lens surface, when counted from the object side, Di is the i-th lens thickness or air separation, and Ni and $\nu i$ are respectively the refractive index and Abbe number of the glass of the i-th lens element.

The shape of the aspheric surface is expressed in the coordinates with an X axis in the direction of an optical axis and an H axis in the direction perpendicular to the optical axis, the direction in which light advances being taken as positive, by the following equation:

$$X = (1/R)H^2/(1 + \sqrt{1 - (1 + K)(H/R)^2}) + BH^4 + CH^6 + DH^8 + EH^{10}$$

where R is the radius of the osculating sphere, and K, B, C, D and E are the aspheric coefficients.

The values of the factors in the conditions (1) to (4) for the numerical examples 1 to 3 are also listed in Table-1. Incidentally, R16 and R17 define a glass plate or like glass material.

| Numerical Example 1: | | |
|---|---|---|
| F = 1–7.63 | FNO = 1:2.05–2.85 | 2ω = 52.4°–7.4° |

| | | |
|---|---|---|
| R1 = 3.0209 | D1 = 0.1538 | N1 = 1.80518  $\nu$1 = 25.4 |
| R2 = 2.0522 | D2 = 0.0769 | |
| R3 = 2.0963 | D3 = 0.8154 | N2 = 1.60311  $\nu$2 = 60.7 |
| R4 = Aspheric | D4 = Variable | |
| R5 = Aspheric | D5 = 0.0923 | N3 = 1.80400  $\nu$3 = 46.6 |
| R6 = Aspheric | D6 = 0.2846 | |
| R7 = 1.8666 | D7 = 0.2615 | N4 = 1.84666  $\nu$4 = 23.9 |
| R8 = 15.3846 | D8 = Variable | |
| R9 = (Stop) | D9 = 0.18 | |
| R10 = Aspheric | D10 = 0.4154 | N5 = 1.58913  $\nu$5 = 61.2 |
| R11 = −35.8587 | D11 = Variable | |
| R12 = 2.5530 | D12 = 0.0923 | N6 = 1.84666  $\nu$6 = 23.9 |
| R13 = 1.1709 | D13 = 0.0431 | |
| R14 = 1.3388 | D14 = 0.5385 | N7 = 1.60311  $\nu$7 = 60.7 |
| R15 = Aspheric | D15 = 0.6154 | |
| R16 = ∞ | D16 = 0.8615 | N8 = 1.51633  $\nu$8 = 64.1 |
| R17 = ∞ | | |

| Variable | Focal Length | | |
|---|---|---|---|
| Separation | 1.00 | 3.03 | 7.63 |
| D4 | 0.24 | 1.96 | 2.97 |
| D8 | 2.94 | 1.22 | 0.21 |
| D11 | 1.14 | 0.61 | 1.26 |

R4: Aspheric Surface

R = −14.4798  K = 1.08935  B = 3.90611 × $10^{-3}$
C = −7.10260 × $10^{-4}$  D = 2.06592 × $10^{-4}$

-continued

R5: Aspheric Surface
R = −1.9074  K = 0  B = 8.98408 × $10^{-2}$
C = 1.40631 × $10^{-1}$  D = −1.87998 × $10^{-1}$
R6: Aspheric Surface
R = 0.8145  K = −1.55509  B = 7.93396 × $10^{-2}$
C = 3.52572 × $10^{-1}$  D = −5.22655 × $10^{-1}$
R10: Aspheric Surface
R = −1.9565  K = 0  B = −2.66532 × $10^{-2}$
C = 6.72653 × $10^{-3}$  D = −1.35897 × $10^{-2}$
R15: Aspheric Surface
R = −2.9259  K = 0  B = 1.6845 × $10^{-3}$
C = 6.87675 × $10^{-3}$  D = −7.4739 × $10^{-2}$

Numerical Example 2:

F = 1−7.62    FNO = 1:2.05−2.85    2ω = 52.4°−7.7°

| | | |
|---|---|---|
| R1 = 5.3266 | D1 = 0.1538 | N1 = 1.80518  ν 1 = 25.4 |
| R2 = 2.8781 | D2 = 0.1123 | |
| R3 = Aspheric | D3 = 0.8462 | N2 = 1.60311  ν 2 = 60.7 |
| R4 = Aspheric | D4 = Variable | |
| R5 = −3.8254 | D5 = 0.0923 | N3 = 1.77250  ν 3 = 49.6 |
| R6 = Aspheric | D6 = 0.2846 | |
| R7 = 1.4841 | D7 = 0.2615 | N4 = 1.84666  ν 4 = 23.9 |
| R8 = 3.50 24 | D8 = Variable | |
| R9 = (Stop) | D9 = 0.18 | |
| R10 = Aspheric | D10 = 0.4154 | N5 = 1.51633  ν 5 = 64.1 |
| R11 = −4.4365 | D11 = Variable | |
| R12 = 3.5559 | D12 = 0.0923 | N6 = 1.80518  ν 6 = 25.4 |
| R13 = 1.0781 | D13 = 0.0431 | |
| R14 = 1.2275 | D14 = 0.5385 | N7 = 1.65844  ν 7 = 50.9 |
| R15 = Aspheric | D15 = 0.6154 | |
| R16 = ∞ | D16 = 0.8615 | N8 = 1.51633  ν 8 = 64.1 |
| R17 = ∞ | | |

| Variable | Focal Length | | |
|---|---|---|---|
| Separation | 1.00 | 2.97 | 7.62 |
| D4 | 0.23 | 1.94 | 2.95 |
| D8 | 2.94 | 1.24 | 0.23 |
| D11 | 1.29 | 0.70 | 1.43 |

R3: Aspheric Surface
R = 2.2573  K = −0.3  B = 1.77924 × $10^{-3}$
C = −1.08059 × $10^{-3}$  D = −3.67656 × $10^{-4}$
R4: Aspheric Surface
R = −8.4827  K = 0  B 3.14205 × $10^{-3}$
C = −1.61555 × $10^{-3}$  D = −3.70427 × $10^{-3}$
R6: Aspheric Surface
R = 0.7089  K = −0.92467  B = −1.50636 × $10^{-2}$
C = 6.00886 × $10^{-2}$  D = −1.71113 × $10^{-1}$
R10: Aspheric Surface
R = 2.1397  K = 0  B = −2.76978 × $10^{-2}$
C = −1.29652 × $10^{2}$  D = 3.80478 × $10^{-3}$
R15: Aspheric Surface
R = −2.9865  K = 0  B = −3.11487 × $10^{-3}$
C = −9.83429 × $10^{-2}$  D = 6.56802 × $10^{-2}$

Numerical Example 3:

F − 1−5.61    FNO = 1:1.85−2.65    2ω = 51.8°−9.8°

| | | |
|---|---|---|
| R1 = 11.4486 | D1 = 0.1492 | N1 = 1.80518  ν 1 = 25.4 |
| R2 = 3.6375 | D2= 0.1089 | |
| R3 = Aspheric | D3= 0.6715 | N2 = 1.60311  ν 2 = 60.7 |
| R4 = Aspheric | D4= Variable | |
| R5 = Aspheric | D5= 0.0895 | N3 = 1.77250  ν 3 = 49.6 |
| R6 = Aspheric | D6= 0.2761 | |
| R7 = 1.6471 | D7 = 0.2537 | N4 = 1.84666  ν 4 = 23.9 |
| R8 = 5.9875 | D8 = Variable | |
| R9 = (Stop) | D9 = 0.18 | |
| R10 = Aspheric | D10 = 0.4029 | N5 = 1.51633  ν 5 = 64.1 |
| R11 = −22.0250 | D11 = Variable | |
| R12 = 2.8928 | D12 = 0.0895 | N6 = 1.84666  ν 6 = 23.9 |
| R13 = 1.2741 | D13 = 0.0179 | |
| R14 = 1.4631 | D14 = 0.5372 | N7 = 1.60311  ν 7 = 60.7 |
| R15 = Aspheric | D15 = 0.5969 | |
| R16 = ∞ | D16 = 0.8357 | N8 = 1.51633  ν 8 = 64.1 |

-continued

R17 = ∞

| Variable | Focal Length | | |
|---|---|---|---|
| Separation | 1.00 | 2.67 | 5.61 |
| D4 | 2.26 | 1.53 | 2.29 |
| D8 | 2.24 | 0.96 | 0.21 |
| D11 | 0.79 | 0.38 | 0.80 |

R3: Aspheric Surface
R= 2.0518        K = 0                       B = 1.10972 × $10^{-2}$
C = 1.80918 × $10^{-3}$   D= −1.56070 × $10^{-3}$
R4: Aspheric Surface
R= −5.2749       K = 0                       B = 9.44629 × $10^{-3}$
C = 2.15273 × $10^{-3}$   D= −1.18989 × $10^{-3}$
R5: Aspheric Surface
R= −2.1595       K = 0                       B = −4.1394 × $10^{-3}$
C = 3.37476 × $10^{-1}$   D= −3.78685 × $10^{-1}$
R6: Aspheric Surface
R= 0.7046        K = 0                       B = −5.22098 × $10^{-1}$
C = 4.56331 × $10^{-1}$   D= −1.8005
R10: Aspheric Surface
R= 1.5668        K = 0                       B = −6.1807 × $10^{-2}$
C = 2.22474 × $10^{-2}$   D= −2.95458 × $10^{-2}$
R15: Aspheric Surface
R= −2.3704       K = 0                       B = 9.19571 × $10^{-3}$
C = 2.39737 × $10^{-2}$   D= −7.62451 × $10^{-2}$

TABLE 1

| Condition | Numerical Example | | |
|---|---|---|---|
|  | 1 | 2 | 3 |
| $\lvert f_2/\sqrt{f_W \cdot f_T}\rvert$ | 0.418 | 0.418 | 0.441 |
| $\lvert f_3/f_4 \rvert$ | 0.860 | 0.717 | 0.837 |
| $N_{21}$ | 1.804 | 1.772 | 1.772 |
| $v_{21}-v_{22}$ | 22.7 | 25.7 | 25.7 |

According to the invention, the conditions for the refractive powers of the four lens units and the relation in which the second and fourth lens units are moved to effect zooming are set forth as described before, and the lens configuration in which the fourth lens unit is moved for focusing is employed, and further the first and second lens units each include at least one aspheric surface of a prescribed shape, thereby reducing the total number of constituent lens elements to 7 or thereabout and minimizing the bulk and size of the entire lens system. Accordingly, the zooming range is extended to 6 or to 8, while still permitting good correction of aberrations to be achieved throughout the entire zooming range and the variation of aberrations with focusing to be minimized at as large a relative aperture as about 1.8–2.0 in F-number. It is, thus, made possible to realize a large relative aperture, high range zoom lens of the rear focus type having a high optical performance.

What is claimed is:

1. A zoom lens of the rear focus type comprising, from front to rear, a first lens unit of positive refractive power, a second lens unit of negative refractive power, a third lens unit of positive refractive power and a fourth lens unit of positive refractive power, zooming being performed by moving said second and fourth lens units, focusing being performed by moving said fourth lens unit, said first and third lens units remaining stationary, said first lens unit comprising, from front to rear, a negative meniscus lens and a bi-convex lens, said second lens unit comprising, from front to rear, a bi-concave lens and a positive lens, and said first and second lens units each having at least one aspheric surface, wherein letting the focal length of the i-th lens unit by $f_i$ and the shortest and longest focal length of the entire lens system by $f_W$ and $f_T$, respectively, the following conditions are satisfied:

$$0.37 < \lvert f_2/\sqrt{f_W \cdot f_T}\rvert < 0.49$$

$$0.65 < \lvert f_3/f_4 \rvert < 0.94$$

2. A zoom lens according to claim 1, wherein said bi-concave lens in said second lens unit has a strong negative refracting surface facing an image side, and wherein at least a surface on the image side of said bi-concave lens is aspherical, said zoom lens satisfying the following conditions:

$$N_{21} > 1.75$$

$$v_{21}-v_{22} > 20$$

where $v_{21}$ and $N_{21}$ are respectively the Abbe number and refractive index of said bi-concave lens in said second lens unit, and $v_{22}$ is the Abbe number of said positive lens in said second lens unit.

3. A zoom lens comprising, from front to rear, a first lens unit having a positive refractive power, a second lens unit having a negative refractive power, a third lens unit having a positive refractive power, and a fourth lens unit having a positive refractive power, said first lens unit consisting of a negative lens of meniscus form convex toward an object side and a bi-convex lens, said second lens unit comprising a bi-concave lens and a positive lens, said third lens unit comprising a single lens, and said fourth lens unit comprising a negative lens of meniscus form convex toward the object side and a bi-convex lens, wherein said second and fourth lens units are moved to effect zooming.

4. A zoom lens according to claim 3, satisfying the following conditions:

$$0.37 < \lvert f_2/\sqrt{f_W \cdot f_T}\rvert < 0.49$$

$$0.65 < \lvert f_3/f_4 \rvert < 0.94$$

where $f_2$, $f_3$ and $f_4$ are the focal lengths of said second, third and fourth lens units, respectively, and $f_W$ and $f_T$ are the shortest and longest focal lengths of the entire lens systems, respectively.

5. A zoom lens according to claim 3, wherein said bi-concave lens in said second lens unit has a strong negative refracting surface facing an image side, and wherein at least a surface on the image side of said bi-concave lens in said second lens unit is aspherical, said zoom lens satisfying the following conditions:

$$N_{21} > 1.75$$

$$\nu_{21} - \nu_{22} > 20$$

where $\nu_{21}$ and $N_{21}$ are respectively the Abbe number and refractive index of said bi-concave lens in said second lens unit and $\nu_{22}$ is the Abbe number of said positive lens in said second lens unit.

6. A zoom lens according to claim 3, wherein said fourth lens unit is moved to effect focusing.

7. A zoom lens comprising, from front to rear:
a first lens unit having a positive refractive power, said first lens unit comprising a negative lens of meniscus form convex toward an object side and a bi-convex lens;
a second lens unit having a negative refractive power, said second lens unit consisting of a bi-concave lens and a positive lens;
a third lens unit having a positive refractive power, said third lens unit comprising a single lens; and
a forth lens unit having a positive refractive power, said fourth lens unit comprising a negative lens of meniscus form convex toward the object side and bi-convex lens,
wherein said second and fourth lens units are moved to effect zooming.

8. A zoom lens according to claim 7, satisfying the following conditions:

$$0.37 < |f_2/\sqrt{f_W \cdot f_T}| < 0.49$$

$$0.65 < |f_3/f_4| < 0.94$$

where $f_2$, $f_3$ and $f_4$ are the focal lengths of said second, third and fourth lens units, respectively, and $f_W$ and $f_T$ are the shortest and longest focal lengths of the entire lens system, respectively.

9. A zoom lens according to claim 7, wherein said bi-concave lens in said second lens unit has a strong negative refracting surface facing an image side, and wherein at least a surface on the image side of said bi-concave lens in said second lens unit is aspherical, said zoom lens satisfying the following conditions:

$$N_{21} > 1.75$$

$$\nu_{21} \nu_{22} > 20$$

where $\nu_{21}$ and $N_{21}$ are respectively the Abbe number and refractive index of said bi-concave lens in said second lens unit, and $\nu_{22}$ is the Abbe number of said positive lens in said second lens unit.

10. A zoom lens according to claim 7, wherein said fourth lens unit is moved to effect focusing.

* * * * *

UNITED STATES PATENT AND TRADEMARK OFFICE
CERTIFICATE OF CORRECTION

PATENT NO. : 5,430,576
DATED : July 4, 1995
INVENTOR(S) : Hiroyuki Hamano

Page 1 of 3

It is certified that error appears in the above-indentified patent and that said Letters Patent is hereby corrected as shown below:

On the title page, items:

[56] References Cited

Foreign Patent Documents, "1201614" should read --1-201614--; and "239011" should read --2-39011--.

[57] Abstract

Line 6, "unit" should --units--; and

Line 13, "asphric" should read --aspheric--.

[75] Inventors

"Kanagawa" should read --Yokohama--.

COLUMN 1

Line 55, "have" should read --have become--.

COLUMN 2

Line 66, "unit" should read --units--.

COLUMN 3

Line 19, "(C)" should read --5(C)--; and

Line 65, "teletphoto" should read --telephoto--.

COLUMN 4

Line 14, "make" should read --made--; and

Line 45, "be" should read --being--.

UNITED STATES PATENT AND TRADEMARK OFFICE
CERTIFICATE OF CORRECTION

PATENT NO. : 5,430,576
DATED : July 4, 1995
INVENTOR(S) : Hiroyuki Hamano

It is certified that error appears in the above-indentified patent and that said Letters Patent is hereby corrected as shown below:

COLUMN 6

Line 34, "osculating" should read --oscillating--.

COLUMN 9

Table 1, "$|f_2/f_W \ \ f_T|$" should read --$|f_2 \sqrt{f_W \cdot f_T}|$--;

Line 67, "unit" should read --unit be denoted--; and

Line 68, "length" should read --lengths--.

COLUMN 10

Line 26, "tem" should read --tem be denoted--.

COLUMN 11

Line 18, "unit" should read --unit,--; and

Line 32, "forth" should read --fourth--.

UNITED STATES PATENT AND TRADEMARK OFFICE
CERTIFICATE OF CORRECTION

PATENT NO. : 5,430,576
DATED : July 4, 1995
INVENTOR(S) : Hiroyuki Hamano

It is certified that error appears in the above-indentified patent and that said Letters Patent is hereby corrected as shown below:

COLUMN 12

Line 2, "bi-convex" should read --a bi-convex--; and
Line 25, "$v_{21}v_{22}>^{20}$" should read --$v_{21}v_{22}>20$--.

Signed and Sealed this

Twenty-eighth Day of November 1995

Attest:

BRUCE LEHMAN

Attesting Officer    Commissioner of Patents and Trademarks